United States Patent Office 3,535,626
Patented Oct. 20, 1970

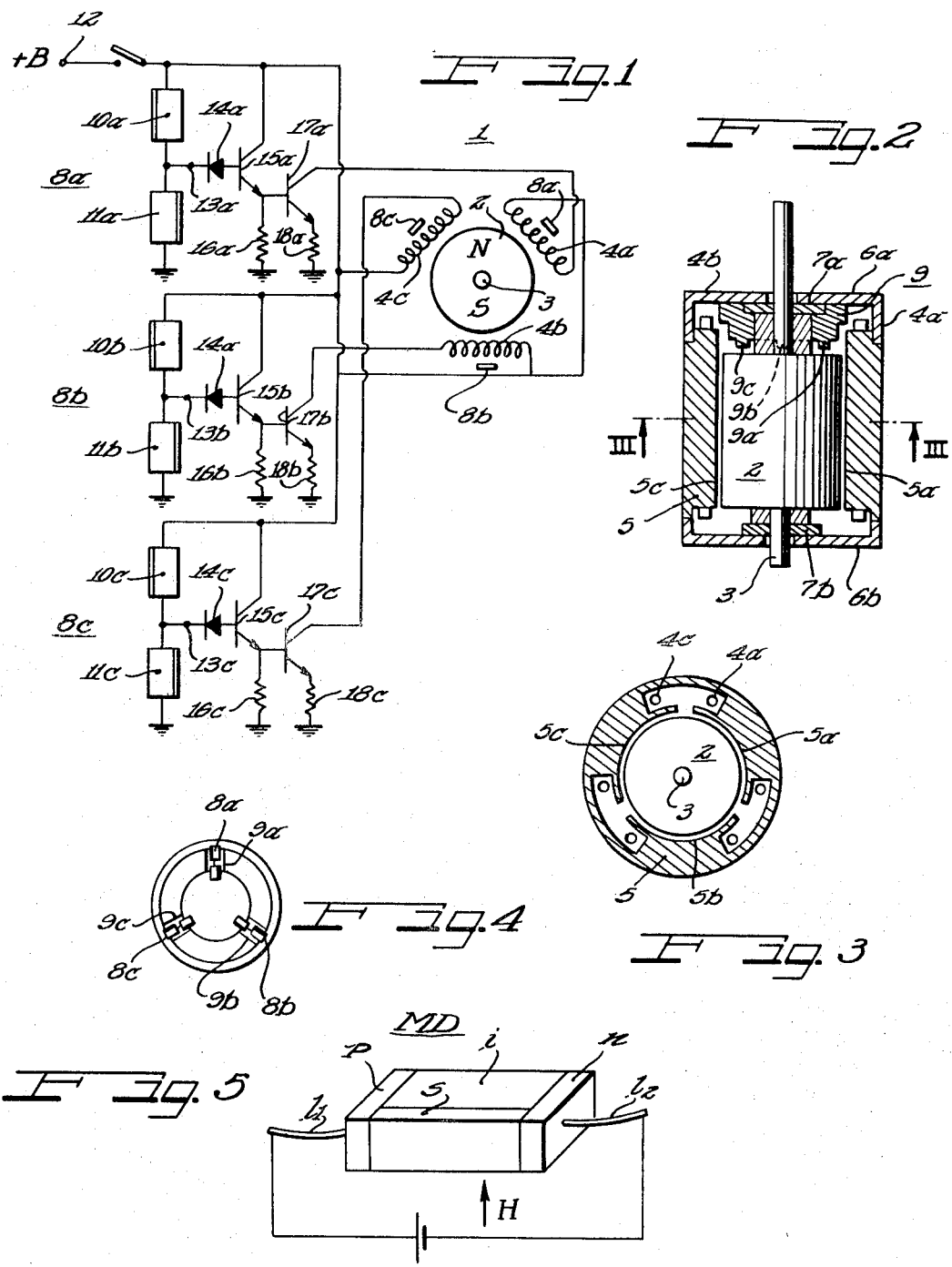

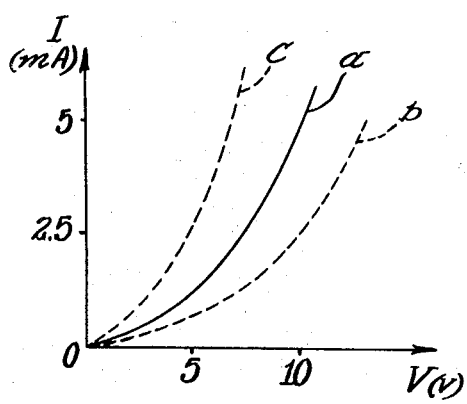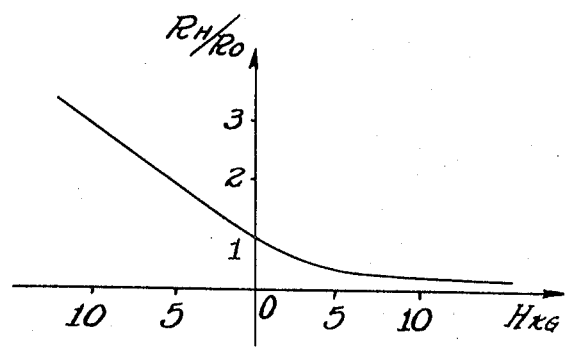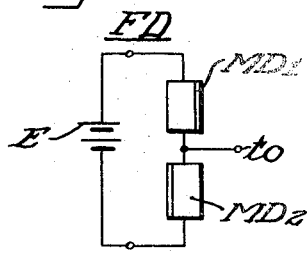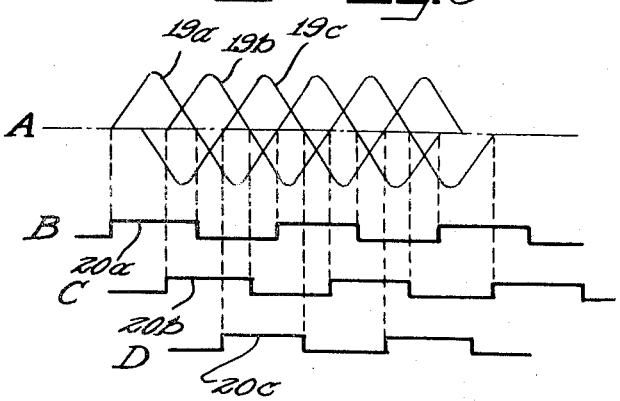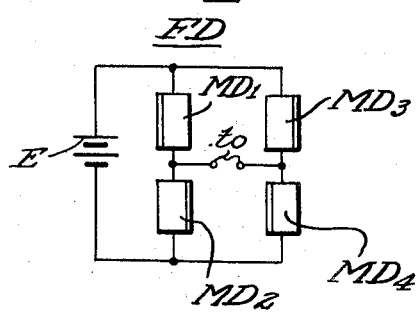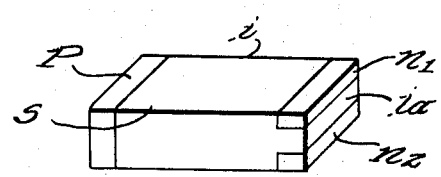

3,535,626
MAGNETO RESISTANCE ELEMENTS FOR
DETECTING MAGNETIC FIELDS
Saburo Uemura and Toshiyuki Yamada, Yokohama-shi, Toshiro Nishikawa, Tokyo, and Yasuo Umezawa, Yokohama-shi, Japan, assignors to Sony Corporation, Tokyo, Japan, a corporation of Japan
Original application Dec. 27, 1967, Ser. No. 693,881. Divided and this application Sept. 4, 1968, Ser. No. 757,402
Claims priority, application Japan, Dec. 30, 1966 (utility model), 42/1,162
Int. Cl. G01r 33/02
U.S. Cl. 324—46                                3 Claims

ABSTRACT OF THE DISCLOSURE

This invention is directed to magnetoresistance elements such as formed with intrinsic semiconductor substrates which produce a variable resistance output in response to a magnetic field. By connecting a pair of magnetoresistance elements in a common circuit and oppositely poled, a very sensitive magnetic field detecting device is obtained. A plurality of pairs of magnetoresistance elements can also be connected in circuit in the form of a bridge to produce a very sensitive magnetic field detecting means.

CROSS REFERENCE TO RELATED APPLICATIONS

This application is a division of application 693,881 entitled "Brushless DC Motor" filed Dec. 27, 1967. The magnetoresistance elements disclosed in this application are disclosed and described in detail in copending application Ser. No. 673,658, filed on Oct. 9, 1967.

BACKGROUND OF THE INVENTION

Field of the invention

This invention relates in general to magnetic field detecting means and in particular to the use of magnetoresistance pairs as detectors.

Description of the prior art

It has often been necessary to detect magnetic fields. For example, compasses detect the earth's magnetic field to indicate the direction toward the magnetic north pole. There are many other applications where magnetic fields must be detected.

SUMMARY OF THE INVENTION

The present invention relates to the use of magnetoresistance pairs in circuit to produce sensitive magnetic field detecting means. Magnetoresistance elements such as disclosed in detail in application Ser. No. 673,658, filed Oct. 9, 1967 are connected in pairs and poled oppositely so that their recombination regions are on opposite sides to detect magnetic fields. A plurality of pairs of magnetoresistance elements may be connected in a bridge circuit to also provide a sensitive magnetic field detector.

Other objects, features and advantages of the present invention will be more fully realized and understood from the following detailed description when taken in conjunction with the accompanying drawings wherein like reference numerals throughout the various views of the drawings are intended to designate the similar elements or components.

BRIEF DESCRIPTION OF THE DRAWINGS

FIG. 1 is a connection diagram schematically illustrating one example of a brushless DC motor produced according to this invention;

FIG. 2 is a cross-sectional view of the motor assembly exemplified in FIG. 1;

FIG. 3 is a cross-sectional view taken along the line III—III in FIG. 2;

FIG. 4 is a top plan view of a supporter of a detecting device for detecting the rotational position of a rotor of the motor;

FIG. 5 is a perspective view schematically illustrating one example of a magnetoresistance element employed in this invention;

FIG. 6 is a graph showing the power source voltage characteristics of the magnetoresistance element depicted in FIG. 5;

FIG. 7 is a graph showing the magnetic field-resistance characteristics of the magnetoresistance element;

FIG. 8 is a connection diagram illustrating one example of a magnetoresistance pair;

FIG. 9 is a diagram for explaining the operation of the motor of this invention;

FIG. 10 is a connection diagram illustrating another example of the magnetoresistance pair; and FIG. 11 is a perspective view illustrating still another example of the magnetoresistance element.

DESCRIPTION OF THE PREFERRED EMBODIMENTS

Seen in FIGS. 1 to 4 is one example of a brushless DC motor constructed in accordance with the principles of this invention. A motor assembly designated generally by reference numeral 1 includes a rotor 2 secured for rotation about a shaft 3. The rotor 2 is magnetized with north and south magnetic poles in the radial direction of the rotor, as illustrated in FIG. 1. As best seen in FIGS. 2 and 3, a stator 5 includes three field coils 4a, 4b and 4c wound about corresponding pole pieces 5a, 5b and 5c, and spaced apart substantially at equal angular distances from each other. The field coils 4a, 4b and 4c are sequentially energized with direct current pulses in such a manner as to rotate the rotor 2. The pole pieces 5a, 5b and 5c are interconnected through the magnetic yoke which is formed by the stator 5, as illustrated in FIG. 3. The axial ends of the stator are closed by covers 6a and 6b each having centrally disposed bearings 7a and 7b, respectively. The bearings 7a and 7b journal the shaft 3 for rotating the rotor 2.

As mentioned hereinabove, the magnetoresistance elements used to control the brushless DC motor of the present invention are fully disclosed and described in U.S. application, Ser. No. 673,658.

The magnetoresistance element MD consists of, for example, an intrinsic germanium substrate $i$ such as depicted in FIG. 5, into which carriers, namely, holes and electrons can sufficiently be injected. The substrate $i$ has formed therein at its both ends P- and N-type regions $p$ and $n$ of relatively high impurity concentrations capable of sufficient injection of the carriers into the substrate $i$. Further, a recombination region S having a comparatively great recombination velocity is formed in the intrinsic region $i$ on one side thereof, extending between the P- and N-type regions $p$ and $n$. The recombination region S can be formed by grinding a selected area of the intrinsic region $i$ with sandpaper or the like to roughen the area to disturb the crystal lattice therein. The P- and N-type regions $p$ and $n$ have connected thereto lead wires $l_1$ and $l_2$ in the manner of ohmic contact. A forward voltage is impressed to the magnetoresistance element MD, namely, a positive potential is fed to the P-type region $p$ and a negative one is fed to the N-type region $n$. In this case the magnetoresistance element MD exhibits current-voltage characteristics similar to those of a usual diode, as indicated by a curve $a$ in FIG. 6.

Upon application of a magnetic field H to the magnetoresistance element MD at right angles to the current path therein, the current is directed to the recombination region S, with the result that the voltage-current characteristic curve becomes as indicated by $b$, namely, the current decreases and the resistance increases. With a magnetic field applied in a reverse direction, the current goes away from the recombination region S to increase the current and decrease the resistance, as indicated by a curve $c$. Thus, the resistance of the magnetoresistance element MD can be varied as desired by controlling the magnetic field applied thereto. FIG. 7 shows the variations in resistance ratio $R_H/R_O$ caused by the magnetic field H. As is apparent from the graph, the magnetoresistance element MD responds in different manners to the magnetic fields of opposite directions and its sensitivity is very high.

In FIG. 8 there is illustrated one example of a magnetoresistance pair consisting of two magnetoresistance elements such as described above. In the present example, magnetoresistance elements $MD_1$ and $MD_2$ are connected in series to each other in forward direction and are further connected to a power source E. The connection point of the magnetoresistance elements $MD_1$ and $MD_2$ is connected to an output terminal $t_o$. In this case, the magnetoresistance elements $MD_1$ and $MD_2$ are connected so that a current passing through the elements is turned by a magnetic field of one direction in such a manner as to be directed to the recombination region S in either one of the elements and repelled away from the recombination region S in the other element. The magnetoresistance pair comprises the magnetoresistance elements as shown. With the power source E being for example, 6 volts, the magnetoresistance pair FD yields from its output terminal $t_o$ a detecting signal of about $3 \pm 2$ volts when exposed to a magnetic field of 2 kilogausses, by which signal a semiconductor element such as a transistor or the like can be directly controlled. Thus, the magnetoresistance pair is highly sensitive. In addition, the magnetoresistance element can be made in such a size as 1 mm.$^2$ in cross-sectional area and several millimeters in length, so that the magnetoresistance pair FD can be extremely miniaturized. Further, the magnetoresistance pair FD has three terminals and is convenient for handling, and the resistances of both ends of the magnetoresistance pair are substantially constant to ensure that the magnetoresistance pair is stable in concentration.

Such magnetoresistance pairs 8a, 8b and 8c are assembled with the motor 1 as the means for detecting the rotational position of the rotor 2. That is, a ring-shaped supporter 9 formed of a magnetic material, for example, soft iron, is mounted on the inside of the cover 6a coaxially with the rotary shaft 3, and the magnetoresistance pairs 8a, 8b and 8c corresponding to the pole pieces 5a, 5b and 5c are mounted on the supporter 9 in opposing relation to the rotor 2. In this case, projections 9a, 9b and 9c are provided on the face of the supporter 9, on which projections the magnetoresistance pairs 8a, 8b and 8c are fixedly mounted adjacent one end face of the rotor 2, as illustrated. The magnetoresistance elements of each magnetoresistance pair are disposed to lie along the radial direction of the rotary shaft 3.

The magnetoresistance pairs 8a, 8b and 8c are respectively connected to the field coils 4a, 4b and 4c through the transistor circuits in such a manner as shown in FIG. 1. That is, both ends of the series circuit of the magnetoresistance elements 10a and 11a (corresponding to those $MD_1$ and $MD_2$ depicted in FIG. 8) constituting the magnetoresistance pair 8a, are connected between a power supply terminal 12 and the ground, and an output terminal 13a of the magnetoresistance pair 8a (corresponding to the terminal $t_o$ in FIG. 8), namely the junction point of the magnetoresistance elements 10a and 11a, is connected through a Zener diode 14a to the base of a transistor 15a, the collector of which is connected to the power supply terminal 12 and the emitter of which is grounded through a resistor 16a. Further, the emitter of the transistor 15a is connected to the base of a transistor 17a, the emitter of which is grounded through a resistor 18a and the collector of which is connected to one end of the field coil 4a, the other end of the field coil 4a being connected to the power supply terminal 12.

The other magnetoresistance pairs 8b and 8c are similarly connected to the field coils 4b and 4c, so that similar components to the above-described ones are identified by the same reference numerals but with different suffixes $b$ and $c$. No further detailed description will be given thereon.

With such an arrangement as has been described in the foregoing, rotation of the rotor 3 leads to application of a three-phase sine wave magnetic field to the magnetoresistance pairs 8a, 8b and 8c. This provides, at the output terminals 13a, 13b and 13c, output voltages 19a, 19b and 19c such as shown in FIG. 9, which are displaced 120° apart in phase. As a result of this, the Zener diodes 14a, 14b and 14c are made conductive by the positive portions of the output voltages to cause conduction of the transistors 15a and 17a, 15b and 17b, 15c and 17c, sequentially disposed 120° apart in phase. Consequently, the field coils 4a, 4b and 4c connected to the transistors 17a, 17b and 17c are sequentially supplied with rectangular wave signals 20a, 20b and 20c such as shown in FIGS. 9B, 8C and 8D, which are phased 120° apart. In this manner, the rotor 2 is driven.

In accordance with this invention, the use of the magnetoresistance pairs provides a brushless DC motor of the type in which the field coils are switchingly supplied with DC current. Further, the magnetoresistance pairs 8a, 8b and 8c are remarkably high in sensitivity and hence are capable of detecting a relatively low intensity magnetic field, as previously mentioned, so that the magnetic field of the rotor 2 can readily be detected, even if it is considerably low in intensity. In addition to the above, the use of the magnetoresistance pairs permits the output transistors 17a, 17b and 17c to be switchingly controlled by the detected outputs entirely without or with slight amplification of the outputs. This ensures stable operation of the detecting device and greatly simplifies its adjustment.

Further, the magnetoresistance pair is very small in size and hence can be disposed in the motor 1 without changing the configuration of the motor significantly. Therefore, the motor does not become bulky and can be made brushless under substantially the same conditions as those of the conventional motors.

Although the supporter 9 may be formed of a non-magnetic material, it is preferred to make the supporter 9 of a magnetic material, for example, soft iron, because when the magnetoresistance pairs 8a, 8b and 8c are mounted on the projected portions 9a, 9b and 9c of the supporter 9, magnetic fluxes are well concentrated on the projected portions to enhance the sensitivity of the detecting device.

While the present invention has been described with reference to a brushless DC motor of three poles, the principles of this invention can be applied to brushless DC motors having two or more poles. In case of two poles, it is necessary to drive the rotor by some means at the start of the rotation. Since the magnetoresistance pair is capable of detecting a static magnetic field as above described, the rotor can be automatically rotated merely by turning the power source switch to its on state. This eliminates the necessity of the provision of a specific starting means.

In the foregoing, the magnetoresistance pair FD is constituted of two magnetoresistance elements, but it may be substituted with a magnetoresistance bridge employing four magnetoresistance elements $MD_1$, $MD_2$, $MD_3$ and $MD_4$ connected in the form of a bridge as depicted in FIG. 10. In this case, adjacent magnetoresistance elements are connected so that elements $MD_1$ and $MD_2$ are in series. Elements MD₂ and MD₄ are also in series. These series branches are mounted in parallel. The elements MD₁ and MD₄ are mounted so that their re-combination regions are on the same sides and elements MD₂ and MD₃ are mounted so that their re-combination regions are on the same side and which is opposite to the re-combination regions of elements MD₁ and MD₃.

Further, the above examples employ the magnetoresistance element MD having the P- and N-type regions $p$ and $n$ each being undivided. However, it is also possible to use a magnetoresistance element such as illustrated in FIG. 11 in which the N-type region $n$ is divided into two portions $n_1$ and $n_2$, one formed on the side of the recombination region S and the other on the opposite side therefrom, and the intrinsic region $i$ is extended between the portions $n_1$ and $n_2$, as indicated at $i_a$. That is, the magnetoresistance element serves as a kind of transistor employing the extended portion $i_a$ as a base, the portion $n_1$ as an emitter and the portion $n_2$ as a collector, by which current variations in the intrinsic region $i$ due to a magnetic field is amplified and is then led out.

Although the magnetoresistance pairs have been disclosed for use with a brushless DC motor, it is to be realized that they may be used for many other uses. For example, the magnetoresistance pair illustrated in FIG. 8 could be rotated until the output signal was maximum or minimum to indicate the earth's magnetic field and could thus be used as a compass. The polarity of the magnetoresistance pair would allow the 180 degree ambiguity to be resolved. For example, a maximum output voltage at terminal $t_o$ in FIG. 8 could mean that the pair MD₁ and MD₂ were aligned and pointing toward the magnetic north pole and a minimum signal could mean that the pair MD₁ and MD₂ were pointing directly away from the magnetic north pole.

The bridge circuit of FIG. 10 produces a signal between terminals $t_o$ which varies in polarity. For example, if the elements MD₁, MD₂, MD₃ and MD₄ are not in a magnetic field which has a component at right angles to the plane of the figure, there will be no voltage across terminals $t_o$. A field with a component at right angles to the plane of the figure will result in a voltage across terminals $t_o$ and the polarity of that voltage will change as the direction of the field changes by 180 degrees.

Although minor modifications might be suggested by those versed in the art, it should be understood that we wish to embody within the scope of the patent warranted hereon all such modifications as reasonably and properly come within the scope of our contribution to the art.

The invention claimed is:

1. Means for detecting a magnetic field comprising a pair of magnetoresistant elements connected in series with one another each comprising a region of semiconductor material having a P-type region, an N-type region and a substantially intrinsic semiconductor region located at least in part between said P-type and N-type regions.

said intrinsic semiconductor region having at least one side surface physically altered to disturb the regularity of the lattic and form an area of increased recombination, a source of E.M.F. connected across said pair of magnetoresistance elements to cause current to pass therethrough, and the pair of magnetoresistance elements positioned relative to each other such that when placed in a magnetic field directed perpendicular to the direction of current flow, the current carriers, in one of the elements will be deflected toward its said area of increased re-combination to increase its resistance and the current carriers in the other of the elements will be deflected away from its said area of increased re-combination to decrease its resistance, and an output terminal connected to the junction point of said pair of magnetoresistance elements to detect said magnetic field.

2. Means for detecting a magnetic field according to claim 1 wherein each of said pair of magnetoresistance elements comprise elongated semi-conductor substances with P- and N-type regions formed thereon with one of the elongated sides of said substrate treated for increased surface re-combination.

3. Means for detecting a magnetic field according to claim 1 comprising a second pair of series connected magnetoresistance elements similar to the first pair of magnetoresistance elements connected in parallel with the first pair of magnetoresistance elements and coplanar therewith so that current passes therethrough, and said second pair of magnetoresistance elements positioned relative to each other and said first pair of elements so that one of said second pair of elements when placed in said magnetic field directed perpendicular to the direction of current flow will have its current carriers deflected toward its area of increased re-combination to increase its resistance and the other of said second pair of the elements has current carriers which will be deflected away from its area of increased re-combination to decrease its resistance, and a second output terminal connected to the junction point of said second pair of magnetoresistance elements.

References Cited

UNITED STATES PATENTS

| | | | |
|---|---|---|---|
| 2,736,858 | 2/1956 | Welker | 338—32 |
| 2,941,163 | 6/1960 | Hess | 324—46 |
| 3,305,717 | 2/1967 | Weiss | 318—254 |
| 3,385,981 | 5/1968 | Mayer et al. | 307—309 |
| 3,435,259 | 3/1969 | Mette | 307—309 |

OTHER REFERENCES

Yhap et al.: Logical Devices, IBM Tech. Disc. Bull., vol. 2, No. 5, February 1960, pp. 59–60.

RUDOLPH V. ROLINEC, Primary Examiner

R. J. CORCORAN, Assistant Examiner

U.S. Cl. X.R.

307—309; 318—254; 338—32

UNITED STATES PATENT OFFICE
CERTIFICATE OF CORRECTION

Patent No. 3,535,626            Dated October 20, 1970

Inventor(s) SABURO UEMURA, TOSHIYUKI YAMADA, TOSHIRO NISHIKAWA and YASUO UMEZAWA It is certified that error appears in the above-identified patent and that said Letters Patent are hereby corrected as shown below:

Column 6, line 1, "lattic" should be --lattice--;

line 20, "substances" should be --substrates--.

Signed and sealed this 17th day of August 1971.

(SEAL)
Attest:

EDWARD M. FLETCHER, JR.
Attesting Officer

WILLIAM E. SCHUYLER, JR.
Commissioner of Patents